Nov. 21, 1967 W. L. WALTERS, JR 3,353,735
APPARATUS FOR PREPARING CANDY APPLES
Filed June 9, 1966 2 Sheets-Sheet 1

INVENTOR.
WILLIAM L. WALTERS, JR.
BY
Thomas W. Flynn

Nov. 21, 1967  W. L. WALTERS, JR  3,353,735
APPARATUS FOR PREPARING CANDY APPLES
Filed June 9, 1966  2 Sheets-Sheet 2
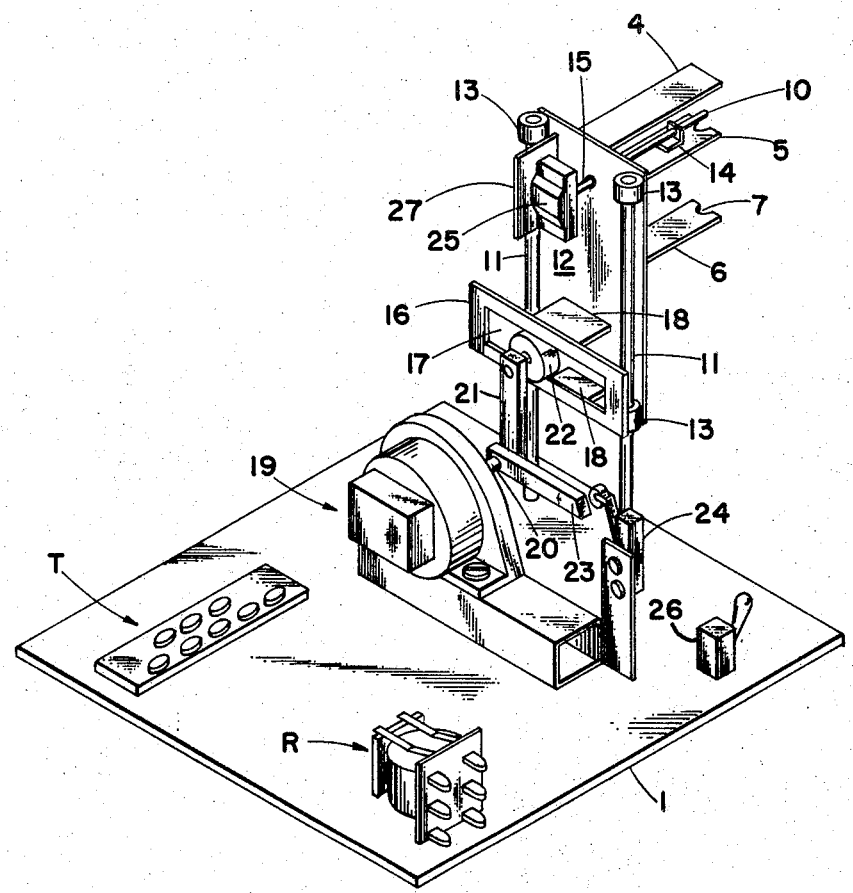
FIG. 5
FIG. 6
INVENTOR.
WILLIAM L. WALTERS, JR.
BY
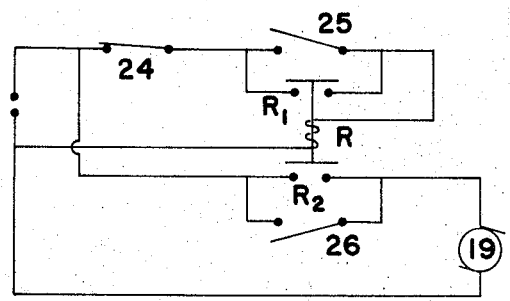

United States Patent Office 3,353,735
Patented Nov. 21, 1967

3,353,735
APPARATUS FOR PREPARING CANDY APPLES
William L. Walters, Jr., 802 Beverly St.,
Covington, Va. 24426
Filed June 9, 1966, Ser. No. 556,392
6 Claims. (Cl. 227—2)

The present invention is directed to apparatus for preparing candy or taffy apples and more particularly, to means for inserting sticks in the apples to serve as handles therefor.

At the present time the insertion of sticks in candy apples is done manually for the most part. This has proved both time consuming and laborious as well as subjecting the hands of the person performing the operation to the risk of injuries through blistering and accidental puncture.

Attempts have been made in the past to design equipment to obviate this situation. The patent to Pikal, 2,733,439, for example, discloses apparatus for inserting sticks into apples on a more or less automatic basis. As described in the patent, apples are manually inserted into conveyor-mounted apple chucks which carry the apples past a stick magazine, where a stick is automatically dropped into place, and then past a hammer which automatically drives the stick into the apple. While this type of apparatus would appear to function satisfactorily for its intended purpose, it will be appreciated that the installation and capital expense of such elaborate equipment would probably only be justified by a high volume operation, permanently located in one place.

However, a large proportion, if not the majority of candy apples manufactured are not prepared on a continuous, high volume basis, but instead, are prepared intermittently in relatively small to medium size batches.

This practice is dictated by two factors. First, candy apple sales in a particular area are usually somewhat cyclical in nature; responding to a high initial demand and then rapidly diminishing to a point where further sales are minimal. Sales, therefore, are usually discontinued after a few days and not begun again until after the demand for the product in that area has again had an opportunity to build up. For this reason, fairs, carnivals, sporting events and the like, which are usually held in a particular area at infrequent intervals, present prime sales opportunities. Secondly, the perishable nature of the apple and its coating requires that the interval between manufacture and consumption be fairly short.

Because of these two factors, therefore, the candy apple vendor usually remains in a particular area for only a few days at a time and carries his manufacturing equipment with him so that the candy apples may be prepared at the point of sales. Obviously, under these conditions the use of large, immobile equipment is highly impractical. Additionally, since most individual vending operations are carried out on a relatively small scale, heavy investment in expensive, automatic equipment is usually not feasible.

Therefore, despite the need for mechanized stick inserting apparatus and prior attempts to provide such apparatus, the stick inserting operation has remained largely a manual process.

It is an object of the present invention, therefore, to provide apparatus which will obviate the necessity of inserting sticks in apples manually.

It is a further object of the present invention to provide apparatus for the intended purpose which is compact and readily transportable and thus ideally suited for use in mobile or semi-mobile concession stands and the like.

It is an additional object of the invention to provide apparatus which is inexpensive and thus, readily available for small scale operations.

It is also an object of the invention to provide apparatus which may be operated by one person.

These and other objects and advantages will become readily apparent from the following detailed description wherein:

FIGURE 5 is a second perspective view of the invention with the casing removed to show details thereof; and FIGURE 6 is a schematic representation of the control circuit of the invention.

Figure 1:
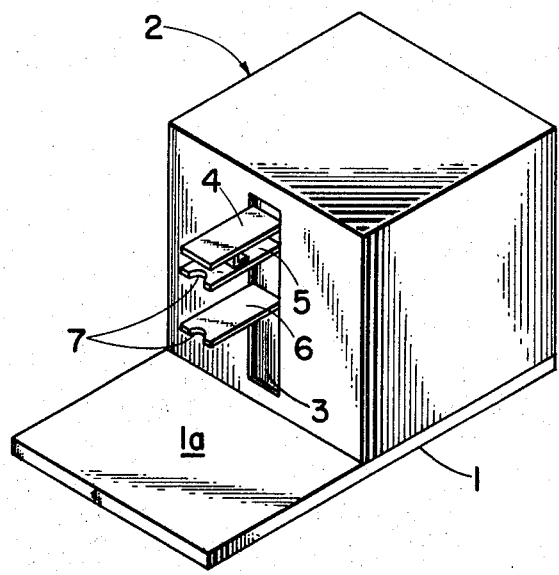
FIGURE 1 is a perspective view of the present invention.

Referring to FIGURE 1, it will be seen that the stick inserting apparatus comprises a base member 1, having a portion 1a extending outwardly to provide a support for an apple to be punctured. A casing 2 is provided to protect the mechanism of the apparatus and the casing is provided with a slot 3 in its forward wall. Protruding outwardly through the slot 3 is a pusher bar 4, which, as will be presently explained, is mounted for reciprocal movement within the slot 3. Also protruding through the slot 3 and mounted for reciprocal movement therein are a pair of stick guides 5 and 6, each having notches 7 formed in their distal portions for receiving a stick therein.

Figure 2:
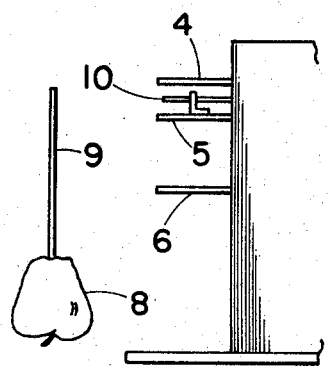
FIGURES 2–4 are partial, elevational views showing the operation of the present invention.
Figure 3:
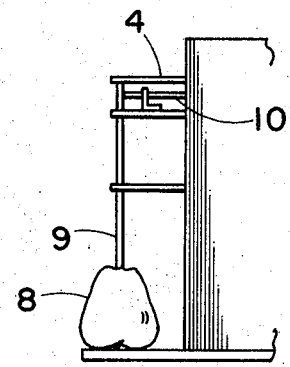
Figure 4:
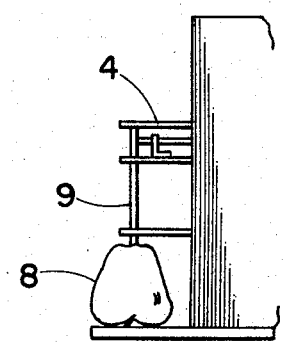

As seen in FIGURES 2–4, an apple 8 and stick 9 are first placed on the support 1a and within the notches 7, respectively. A pin member 10, mounted for movement longitudinally thereof, is positioned between the pusher bar 4 and upper stick guide 5 with its distal portion slightly extending beyond the rearward portion of the notch 7 formed in guide 5. Therefore, as the stick 9 is seated in the notches 7, as in FIGURE 3, the pin 10 is depressed, energizing mechanism which causes the pusher bar 4 to drive the stick 9 into the apple 8 as seen in FIGURE 5. Further mechanism, presently to be described in detail, then causes the pusher bar, stick guides and pin to return to their initial position and stop, ready for the next apple and stick.

Turning to FIGURE 5 of the drawings, the mechanism for accompanying the above operations will now be described. As seen in FIGURE 5, the base member 1 has a pair of posts 11 mounted thereon and extending upwardly therefrom. A carriage plate 12 is provided, having sleeves 13 fixed to its rear surface with vertically aligned pairs of sleeves embracing each of the posts 11. The pusher bar 4, and stick guides 5 and 6 are rigidly attached to the front surface of the carriage plate and the pin 10 is supported for movement longitudinally thereof by an apertured angle bracket 14 and an aperture 15 in the carriage plate 12.

A cam plate 16 having a slot 17 formed therein, is mounted in spaced relation to the carriage plate by means of spacer blocks 18 with the slot 17 extending generally perpendicular to the direction of movement of the carriage plate 12.

A conventional electric motor 19 of suitable size and speed having a rotatable shaft 20 is also mounted on the base member 1 to the rear of the carriage plate 12. Mounted on the shaft 20 of the motor for rotation therewith is a cam arm 21 having a cam follower 22 rotatably mounted on its opposite end. As will be seen in FIGURE 5, the cam follower 22 is received between the opposed camming surfaces defined by the upper and lower boundaries of the slot 17.

A switch arm 23 is also fixed to the shaft 20 to the rear of cam arm 21 and extending from the shaft 20 at an angle to the cam arm 21. A conventional roller type micro switch 24, normally closed, is mounted with its spring supported roller in the path of the switch arm 23 as arm 23 rotates with shaft 20. A second, normally open, micro switch 25, which may also be of conventional construction, is mounted by means of a bracket 27 to the rear surface of carriage plate 12 in position for actuation by pin member 10. A toggle switch 26, relay R and terminal strip T are also mounted on the base member 1 with the switches, relay and motor 19 connected through the terminal strip to any suitable source of electric power.

Referring now to FIGURES 5 and 6, the operation of the invention will now be described in detail. As previously noted, when a stick is placed in the notches 7 of the stick guide 6, the pin 10 is depressed, causing normally open micro-switch 24 to close and actuate the relay R. Upon actuation of the relay R, relay contacts $R_1$ and $R_2$ are caused to close, completing the circuit between the power source and the motor 19. Shaft 20 of motor 19 then rotates, causing cam arm 21 to rotate with cam follower 22 attached to its outer end. Rotation of cam arm 21, as viewed in FIGURE 5, causes cam follower 22 to press downwardly on the lower surface of cam slot 17, moving carriage plate 12 to its lowermost point of travel. Continued rotation of cam arm 21 then causes cam follower 22 to press upwardly against the upper surface of cam slot 17 moving carriage plate 12 upwardly. As carriage plate 12 begins to move upwardly, the apple 8, with the stick 9 fully inserted therein, may now be removed by the operator and a second apple and stick obtained for processing. Removal of the apple and stick allows the normally open switch 25, which has been held closed by the stick 9 pressing against pin 10, to once again open. As will be apparent from FIGURE 6, however, through the use of relay R and normally closed switch 24, power is still supplied to motor 19 causing its shaft to continue to rotate and raise the carriage plate toward its uppermost limit of travel. Switch arm 23 is fixed on shaft 20 and positioned so that just as carriage plate 12 reaches its uppermost limit of travel, switch arm 23 contacts and opens normally closed switch 24. As will be apparent from FIGURE 6, opening of switch 24 deactivates relay R and breaks the circuit to motor 19, causing the motor and carriage plate to stop. The apparatus is then ready to receive another apple and stick and repeat the process described above. A toggle switch 26 is also provided so that, if desired, the relay R and switches 24 and 25 may be bypassed and the stick inserting apparatus operated continuously.

From the above, detailed description it will be apparent that applicant has provided apparatus for preparing candy apples which eliminates the necessity of inserting the sticks in the apples manually and yet is compact, relatively inexpensive and readily operated by one person.

While a preferred embodiment has been described in detail for purposes of illustration, various modifications thereof will be apparent to those skilled in the art within the scope of the appended claims.

I claim:
1. Apparatus for preparing candy apples comprising:
  (a) a carriage member,
  (b) means mounting said carriage member for generally linear, reciprocal movement,
  (c) a push bar for engaging the end of a stick, said push bar being mounted on said carriage member for movement therewith,
  (d) a pair of spaced, opposing camming surfaces fixedly associated with said carriage member and extending generally perpendicular to the direction of said reciprocal movement of said carriage member,
  (e) a cam follower positioned between said camming surfaces, and
  (f) means for imparting arcuate motion to said cam follower.

2. The apparatus of claim 1 wherein said means for imparting arcuate motion to said cam follower comprises:
  (a) a rotatable shaft,
  (b) means for rotating said shaft about its longitudinal axis, and
  (c) a cam arm mounted on said shaft and extending generally perpendicular therefrom,
  (d) said cam follower being mounted on said cam arm in spaced relation to said shaft.

3. The apparatus of claim 2, further comprising:
  (a) means mounted on said carriage member for positioning a stick beneath said push bar,
  (b) a first, normally open, micro-switch positioned for actuation by the presence of a stick in said stick positioning means,
  (c) a switch mounted on said shaft and extending generally perpendicularly therefrom for rotation therewith, and
  (d) a second, normally closed, micro-switch positioned for engagement by said switch arm as said switch arm rotates with said shaft.

4. The apparatus of claim 3 wherein:
  (a) a cam plate is mounted on a surface of said carriage plate opposite the surface on which said push bar is mounted,
  (b) portions of said cam plate define an elongated slot formed in said cam plate, and
  (c) said camming surfaces are constituted by portions of said slot boundaries.

5. The apparatus of claim 4 wherein said means mounting said carriage member comprises:
  (a) a base member,
  (b) a pair of posts extending from said base member in spaced, parallel relationship,
  (c) sleeve members mounted on said carriage member and slidably receiving said posts.

6. Apparatus for preparing candy apples comprising:
  (a) a base plate,
  (b) a pair of upright posts mounted on said base plate and extending from said base plate in spaced, parallel relationship to each other,
  (c) a carriage plate,
  (d) said carriage plate having at least two pairs of sleeve members attached to the rear surface thereof,
  (e) one of said pairs of sleeve members engaging one of said upright posts, and the other of said pairs of sleeve members engaging the other of said upright posts,
  (f) a cam plate attached to the rear surface of said carriage plate,
  (g) portions of said cam plate defining a slot extending perpendicularly to said upright posts,
  (h) a cam follower positioned within said slot,
  (i) a motor having a rotatable shaft,
  (j) a cam arm mounted adjacent one end thereof on said shaft,
  (k) said cam follower being rotatably mounted on the opposite end of said cam arm,
  (l) a switch arm mounted on said shaft,
  (m) a normally closed micro-switch mounted on said base in the path of said switch arm as said switch arm rotates with said shaft,
  (n) a normally open micro-switch mounted on the rear surface of said carriage plate, (o) a pair of spaced stick guides mounted on the front surface of said carriage plate each having vertically aligned portions defining stick receiving notches, (p) a pin member mounted for movement longitudinally thereof and extending through said carriage plate with one end of said pin member positioned adjacent to and for engagement with said normally open micro-switch and the other end of said pin positioned adjacent to said stick receiving notches for engagement by a stick, and (q) a push bar mounted on the front surface of said carriage plate above said stick guides.

References Cited

UNITED STATES PATENTS

| | | | |
|---|---|---|---|
| 2,733,439 | 2/1956 | Pikal | 227—2 |
| 2,783,470 | 3/1957 | Valdez | 227—7 |

GRANVILLE Y. CUSTER, JR., *Primary Examiner.*